US006782509B1

(12) United States Patent
Hirayama et al.

(10) Patent No.: US 6,782,509 B1
(45) Date of Patent: Aug. 24, 2004

(54) METHOD AND SYSTEM FOR EMBEDDING INFORMATION IN DOCUMENT

(75) Inventors: Yuki Hirayama, Kawasaki (JP); Tomio Amano, Yokohama (JP); Shuichi Shimizu, Yokohama (JP); Norishige Morimoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,945

(22) Filed: Sep. 15, 1999

(30) Foreign Application Priority Data

Sep. 17, 1998 (JP) ........................................... 10-262623

(51) Int. Cl.⁷ ............................. G06F 17/00; G06K 9/34
(52) U.S. Cl. ....................... 715/531; 382/180; 382/177; 382/200; 713/176; 715/530
(58) Field of Search ................................ 707/530, 531; 713/176; 382/180, 201, 200, 177; 715/531, 530

(56) References Cited

U.S. PATENT DOCUMENTS

| 5,467,447 | A | | 11/1995 | Vogel et al. ................. 395/145 |
|---|---|---|---|---|
| 5,519,412 | A | * | 5/1996 | Watanabe ................. 345/472.2 |
| 5,583,978 | A | * | 12/1996 | Collins et al. ............... 345/170 |
| 5,606,649 | A | * | 2/1997 | Tai ............................ 358/1.11 |
| 5,689,587 | A | | 11/1997 | Bender et al. .............. 382/232 |
| 5,761,686 | A | * | 6/1998 | Bloomberg .................. 707/529 |
| 6,249,870 | B1 | * | 6/2001 | Kobayashi et al. .......... 713/176 |
| 6,327,385 | B1 | * | 12/2001 | Kamitani ..................... 382/177 |
| 6,360,010 | B1 | * | 3/2002 | Hu et al. ..................... 382/180 |
| 6,408,082 | B1 | * | 6/2002 | Rhoads et al. .............. 382/100 |

FOREIGN PATENT DOCUMENTS

| EP | 066275 A2 | 12/1993 | ............ G07D/7/00 |
|---|---|---|---|
| EP | 0782322 A2 | 12/1995 | ............ H04N/1/32 |
| GB | 2339656 A | 7/1998 | ............ G06F/1/00 |

OTHER PUBLICATIONS

Adobe Systems Inc. Portable Document Format Referene Manual, Vers. 1.1 Nov. 27, 1996.*

* cited by examiner

Primary Examiner—Stephen S. Hong
Assistant Examiner—Matthew Ludwig
(74) Attorney, Agent, or Firm—Louis Herzberg; Anne V. Dougherty

(57) ABSTRACT

A method and a system for embedding information in document data that include text written in a page description language. First, an analysis is made of the layout of the document data in which information is to be embedded. Then, based on the analysis of the layout, a sequence of locations is generated whereat the information is to be embedded. A page description of the text at a determined location is changed in accordance with the embedded information. As a result, the information is embedded in document data that include text written in a page description language. The sequence of locations is generated by producing a string of sequential pseudo-random numbers.

8 Claims, 8 Drawing Sheets

FIG. 1

Generate a sequence of locations:
aji,bji (j=0,...,N−1 i=1,...,n)

Break down a character string object

Layout analysis:

```
for (j=1; j≤N; j++) {
  for (i=1; i<=n; i++) {
    to embed 1:
      to increment aji:
      to decrement bji:
    to embed 0:
      to decrement aji:
      to increment bji:
  }
}
```

Prepare page description data

Difficult analyzation of character string object

Electronic watermark embedding processing

---

Layout analysis:

```
for (j=1; j≤N; j++) {
  calculate Σ (aji − bji):
  equal to or greater than positive
    threshold value: output 1
  equal to or smaller than negative
    threshold value: output 0
  other cases: determine there is no
    embedded information
```

Electronic watermark detection processing

THE Java Jive remains a Top 10 hit among the technology crowd. Software developers are singing praises for the Java programming language while its creator. Sun Microsystems Inc.. is in danger of being muscled out as the principal composer.

And on the eve of this week.s JavaOne conference in San Francisco. conventional wisdom also holds that Java.s ..write once. run anywhere.. melody is nothing but a bunch of clinkers. Sun has hit plenty of bad notes here. but I.m beginning to see signs that practice could yet make perfect. or close enough for jazz.

FIG.3

The Internet easily enables
communication among
people around the world.

 Delete information

Theblstecoetmansidtion
aroond pleepleorld.

FIG.4

METHOD AND SYSTEM FOR EMBEDDING INFORMATION IN DOCUMENT

FIELD OF THE INVENTION

The present invention relates to a method for embedding additional information, including text data, i.e., so-called electronic watermark information, in an electronic document, a method for preventing the destruction of such embedded information, a method for preventing the re-use of such embedded information, and a system therefor.

BACKGROUND OF THE INVENTION

As a large amount of information can be distributed across the Internet, or by using CD-ROMs, businesses that provide services for the conduct of electronic searches and for the distribution of documents containing digital data have become important. To ensure the safe development of such businesses, techniques that can provide for the management of copyrighted material contained in digital documents that are distributed and that can protect the rights of owners are indispensable. Such techniques are also required by companies that wish to protect secret material contained in digital documents, and to find and trace routes along which secrets may have been leaked.

The techniques applied for managing copyrighted electronic data can be roughly broken down into the two techniques of access control, for which encryption and authentication are employed, and electronic watermarking. The aim of the first technique is to ensure that access to the contents of selected digital material is limited to those users who pay for the privilege, or to users whose employment of the material is controlled by a manager. The latter technique provides a function by which the secondary outflow of decoded data contained in digital documents can be prevented, or can be traced. These two techniques must be combined in order to provide for the rigorous management of copyrighted material.

Among the various types of media, there is a very large demand for the use of the electronic watermark technique for text data that are distributed in volume. However, since in pure text data there is little redundancy in the expression of information, it is very difficult to embed information that supplements the original contents, i.e., electronic watermark information. In "Proposal for the digital watermarking of PostScript and PDF documents," Ryujiro Shibuya, Yuichi Kaji and Tadao Kasa, SCIS98-9.2.E (prior art 1), Japanese Unexamined Patent Publication No. Hei 7-222000 (prior art 2) and Japanese Unexamined Patent Publication No. Hei 6-324625 (prior art 3), a technique is proposed whereby watermark information is embedded in the document description, to include appearance and layout, while the focus is on the fact that a page description form, such as PS (PostScript) or PDF (Portable Document Format), tends to be employed for the actual distribution of text data. In the above prior art, slight changes in line spacing and word spacing and in fonts are employed to embed information in documents.

However, it is difficult to use the above described conventional technique to manage copyrights, or to specify a route along which secrets may have been leaked, when the following two conditions are not satisfied.
1. Detection of a watermark in data contained in multiple documents can be performed only by a user who possesses a common detection key.
2. The technique is sufficiently robust that during ordinary distribution processing it can prevent format conversions and the destruction of material by an unauthorized user.

However, prior art 1 does not teach a specific detection method that can satisfy condition 1. And the method described in prior arts 2 and 3 requires a comparison with the original document data, except for a method for manipulating the base line of character lines. Since information for watermark detection must be recorded and managed for each document in which a watermark has been embedded, in a large system this method is difficult to use. None of the above methods supports the protection system for which a key is used (a system according to which only a key owner is permitted to detect a watermark).

As for condition 2, only a study of the re-scanning of printed data has been written in prior art 2, and no consideration has been given to rendering page description data sufficiently robust to prevent its own destruction. Actually, many page description formats are open to the public, and may be destroyed. For example, a watermark embedded in a line space by manipulating the base line can be easily destroyed by slightly adjusting the positioning of the individual lines and by maintaining a constant width. In addition, only pure text data in which no watermark information is embedded may be extracted from page description data and employed.

In Japanese Unexamined Patent Publication No. Hei 8-348426 (prior art 4), a method is proposed for embedding a watermark using the statistic property of two sequences of locations. Although the technique described in prior art 4 is not an invention related to the electronic watermarking of text, this technique satisfies condition 1, and as far as condition 2 is concerned, it enables sufficiently robust embedding when the locations are changed at random. However, it is difficult to adapt this technique to page description. If this technique is employed for page description, a method for designating the sequence of locations is not obvious, which differs from the embedding of a watermark in an image. An object whose location is to be adjusted must be uniquely identified when embedding a watermark. The page description constitutes a set of page description objects (characters or character strings), including positional information, and does not include information for identifying and ordering the individual elements. While, for an image, pixels and small domains can be specified by using X and Y coordinates, in page description an object whose location can be adjusted in a specific domain designated by the coordinates is not always present once a document and a page are changed. Since in page description the order in which objects are positioned on a page image does not affect the appearance of the image, the order in which the objects appear in a file format is of no help when an object is being specified. Actually, the order in which objects appear in a file may be changed as the result of format conversion or of an attempt by a third party to destroy them (an attack).

Furthermore, none of the above prior art examples provides for the resolution of a problem whereof only pure text data are extracted from page description data. Since the specifications employed for page description that are distributed across the Internet are open to the public, an adequate program need only be formed that can extract only text data mechanically. In addition, the display software for page description frequently supports the delivery of data to another program using Cut&Paste. In this case, a common user can extract text. The PDF display software employs a password to control access permission and to prohibit the use of Cut&Paste. In the current system, however, if printing is permitted, only a PDF->PS->PDF conversion (information for managing a password is omitted through the conversion into PS) need be performed to remove protection. For some applications, therefore, text may be extracted from page description data and illegally traded.

It is, therefore, one object of the present invention to provide a method and a system for embedding information in document data that include text written in a page description language.

It is one more object of the present invention to provide a method and a system for detecting embedded information in document data that include text written in a page description language.

It is another object of the present invention to provide a method, for embedding an electronic watermark in document data that include text written in a page description language, whereby a common detection key is employed to detect electronic watermarks in multiple documents, and a system therefor.

It is an additional object of the present invention to provide a method for embedding information in document data that is sufficiently robust to prevent a format conversion during common data distribution processing and during an attack mounted by an unauthorized user, and a system therefor.

It is a further object of the present invention to provide a method for embedding information in document data whereby an object for which the feature is to be operated can be uniquely identified, and a system therefor.

It is one further object of the present invention to provide a method and a system for preventing the extraction of text from page description data.

It is yet one more object of the present invention to provide a method and a system for embedding in document data, as a watermark, information that represents a copyright.

It is yet another object of the present invention to provide a method and a system for embedding information in document data, and for preventing, through mechanical processing, the removal from a document of an electronic watermark.

SUMMARY OF THE INVENTION

To achieve the above objects, first, an analysis is made of the layout of the document data in which information is to be embedded. Then, based on the analysis of the layout, a sequence of locations is generated whereat the information is to be embedded. A page description of the text at a designated location is changed in accordance with the embedded information. As a result, the information is embedded in document data that include text written in a page description language. The sequence of locations is generated by producing a string of sequential pseudo-random numbers.

When, for example, a statistic method (prior art 4) is employed to embed electronic watermark information in a page description language, such as PDF, two sequences of locations are designated based on a description of the layout structure of a document. Using the layout description, descriptive data can be provided by which a pair of designated locations can evidence a strong correlation with multiple documents, each of which has a different layout, and the reliability of the embedding process can be increased.

To detect information embedded in document data, first the layout of the document data in which information is embedded is analyzed. Then, a sequence of locations whereat the information is embedded is generated based on the analyzed layout. The embedded information is obtained from a page description entered for text at a determined location. The sequence of locations is generated by employing a string of sequential pseudo-random numbers used for embedding information.

To embed non-alterable information in document data, first a string of characters in which information is to be embedded is extracted from the text. Then, the extracted string of characters is broken down into smaller units. A page description that represents either a relative distance traveled from a reference point of the string of characters, or a relative distance traveled from a reference point of the previous character is changed in accordance with the information to be embedded. Here, when the original string of characters is broken down it means either that individual characters are extracted or that smaller strings are formed.

According to another aspect of the embedding of non-alterable information in document data, first, a layout of the data in a document in which information is to be embedded is analyzed. Then, one or more characters are selected from the analyzed layout. A font representing the selected character is created, and the page description is changed so that the font can be used to replace the selected character.

These methods are those whereby, when an object in a page description language is mechanically relocated, page description data are so constructed that an unnatural change in the appearance of the object occurs. With these methods, an unauthorized user is prevented from manipulating an object in page description data by performing one of the following processes: the division of a character object set that constitutes one line, and storage of the divided object segments at separate locations in a PDF format; the embedding of dummy information by using a method whereby the appearance of an object is changed if the embedded information is deleted; or the use of a single font to express two characters.

In order to prevent the extraction of embedded information from document data that include text written in a page description language, first, a character is selected from the text. Then, a graphic primitive is created that represents the selected character, and page description data is changed so that the graphic primitive can be used to replace the selected character.

One part, or all, of the coded text in the page description data is changed so that it can be written using a special character code system, and is replaced by using a graphic primitive for display and printing. So long as a dedicated browser that understands a page description language is employed, in addition to other characters, a character replaced using the graphic primitive can be displayed or printed. However, since that character is not coded as text, another application can not extract it from the page description data.

BRIEF DESCRIPTION OF THE DRAWINGS

The invention will now be described in greater detail with specific reference to the appended drawings wherein:

FIG. 1 is a diagram showing pseudo-code for the embedding and the detection of a watermark according to the present invention;

FIG. 3 is a diagram showing an example wherein files before and after a watermark is embedded are overprinted;

FIG. 4 is a diagram showing the results obtained by an equalization attack on the method of the present invention;

DETAILED DESCRIPTION OF THE PREFERRED EMBODIMENT

Figure 2:
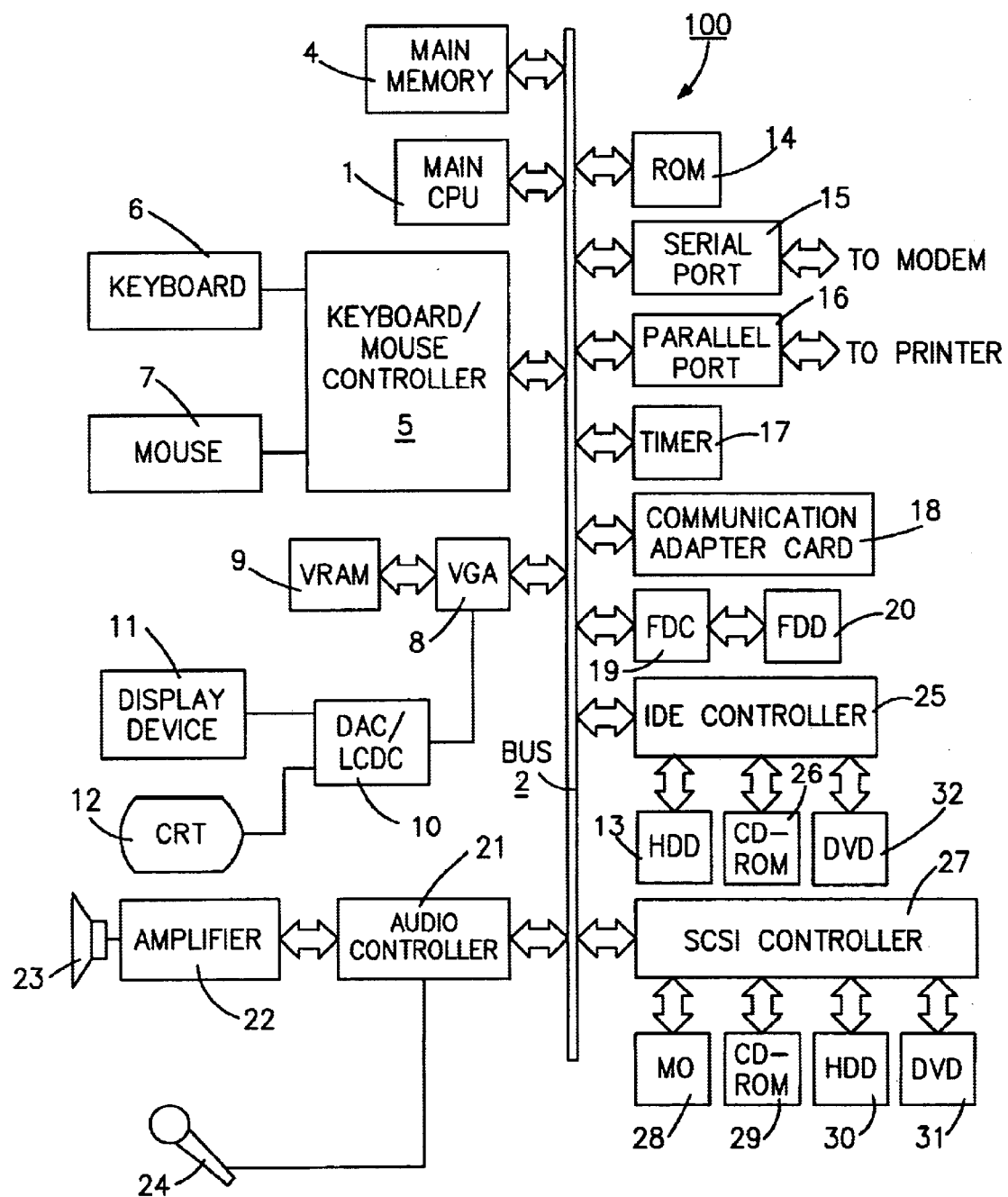
FIG. 2 is a diagram illustrating an example hardware arrangement for a system according to the present invention.

(1) Designation of a Sequence of Locations Based on Layout Structure

The legibility of a document is maintained even when the position and the shape of an object in page description data are changed slightly. As is described in the prior art, watermark information can be embedded in the page description data by changing the position and the form of the object. In this embodiment, basically, the description of the layout structure of a document is employed to designate a sequence of locations using a statistic embedding method. In the following explanation, employed as the embedding feature is information for a change in pitch (character feeding distance) between two designated characters and their succeeding characters.

Specifically, the feature is described as having the form "a difference constituting a change in a character pitch between the c1-th character and the c2-th character in the 1-th line on page p." Here, p, 1, c1 and c2 (c1<c2) are natural, pseudo-random determined numbers. To designate line 1, the document image layout analysis method is employed to collect, for each line, character (string) objects on a page and to sort them in accordance with adequate rules. Since the number of columns and the column writing/horizontal writing status differ, depending on the document, an adequate rule for the order in which lines are counted is determined in advance; but this rule may not always provide the correct order for data to be read by a user. It is important for the same result to be provided for an arbitrary document before and after the completion of the embedding and the detection processes. A rule such as "only a full-size font of 9.5 to 10.5 points is a target for the counting of lines or characters," or "the metrics of a character font that appears from c1 to c2 is employed to normalize a distance" may be employed so long as a third party understands that the rule is not self-indulgent. This rule improves the correlation between two feature sequences and increases the ability to withstand a random attack.

In FIG. 1, the processing according to the present invention for embedding and detecting a watermark is shown using pseudo-code. Before the embedding process, a sequence of locations to be used for embedding and detection is determined. N pairs of a sequence of locations are prepared for embedding N-bit information, and the sequence of locations that represents the j-th bit (j=1, ..., N) is defined as $a_{ji}$, $b_{ji}$ (i=1, ..., n). The length n of the sequence of locations is set in accordance with the strength of a required watermark, and the values of the individual locations are designated based on the layout description. Four natural numbers represented by page p, line 1 and characters c1 and c2 are employed to designate $a_{ji}$ and $b_{ji}$. When an actual line overflows the c1-th character of the 1-th line, the succeeding line is sequentially counted. When a character to be processed has already been defined as one that is to be embedded, program control skips to the first subsequent character that has not yet been embedded. The entries $a_{ji}$ and $b_{ji}$ represent the changes in the pitches of corresponding characters, and their locations are acquired as follows. The font includes information called font metrics, and included in the font metrics is information concerning character width, which represents the distance between the point of origin of a character and the point of origin of a succeeding character. The difference between the actual width of a character and the width given for the character in the information contained in the font metrics is defined as a feature. Specifically, a value obtained by normalizing the actual width of a character using the width given in the font metrics for that character is employed as a feature value. And the differences between feature values is used for the embedding and the detection of information.

A character string object in page description data, in which information is to be embedded, is divided so that the locations of characters c1 and c2 can be operated for all $a_{ji}$ and $b_{ji}$. A portion not used for embedding is also divided at random so that an unauthorized user can not easily acquire information concerning an embedding location. A layout analysis (that uses information concerning the divided character string objects instead of the character string rectangles detected from an image) is performed for a set of divided character string objects so that it can be re-constructed as a line of data. Based on the obtained line of data, characters corresponding to $a_{ji}$ and $b_{ji}$ are selected a locations in the document whereat information is to be embedded.

For the embedding of information, as is described in prior art 4, a sequence of locations corresponding to j is selected, and when the j-th bit is "1," to increment $a_{ji}$-$b_{ji}$ the character position is shifted from the point at which i=1 to the point at which i=n. Specifically, for $a_{ji}$, a character represented by c1 is moved to the right (down for a column writing), or a character represented by c2 is moved to the left (up for a column writing). To reduce the value at a location, all that is required is for an inverted operation to be performed. When the j-th bit is "0," the character position is shifted so as to reduce $a_{ji}$-$b_{ji}$.

Figure 7:
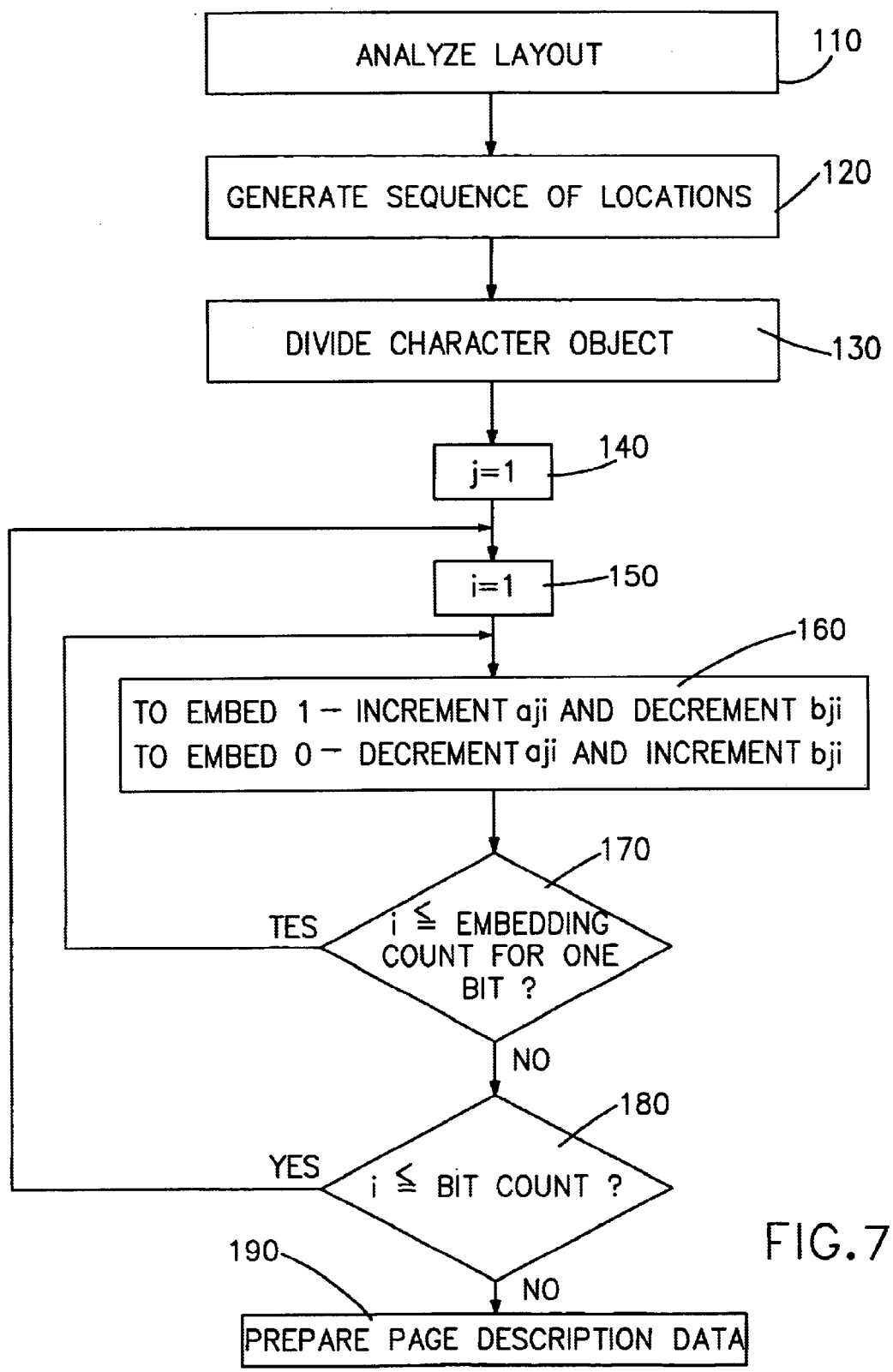
FIG. 7 is a flowchart showing the watermark embedding processing according to the present invention.

FIG. 7 is a flowchart showing the above information embedding processing. At step 110 the layout analysis is performed. The layout analysis corresponds to the ordering of characters for which physical positional information is based on the layout structure. At step 120 a sequence of locations is generated, and at step 130 a character object is divided. The sequence of locations is used to generate a string of pseudo-random numbers based on a specific key and to determine an embedding location. At step 140 j is initialized as "1," and at step 150 i is initialized as "1." At step 160, $a_{ji}$ is incremented and $b_{ji}$ is decremented to embed "1," while $a_{ji}$ is decremented and $b_{ji}$ is incremented to embed "0." At step 170 a check is performed to determine whether i is equal to or smaller than an embedding count for one bit. If the decision is Yes, program control returns to step 160. If the decision is No, at step 180 a check is performed to determine whether j is equal to or smaller than the bit count. When the decision is Yes, program control returns to step 150. When the decision is No, at step 190 page description data are generated.

In the above processing, three methods are used to change $a_{ji}$ and $b_{ji}$: a method according to which only $a_{ji}$ is changed, a method according to which only $b_{ji}$ is changed, and a method according to which both $a_{ji}$ and $b_{ji}$ are changed. In addition, for aji and bji, three methods each are used to change the positions of c1 and c2: a method according to which only the position of c1 is changed, a method according to which only the position of c2 is changed, and a method according to which the positions of both are changed. A combination of these methods is selected at random for aji and bji. As a result, this combination method better resists an attack by an unauthorized user who seeks to extract or to delete a watermark, or to analyze an algorithm, than does a method that is not selected at random.

The location of a character object in which a watermark is embedded is calculated, and page description data are prepared using new coordinate information. In a page description language, an object such as a character is described by adding coordinate information. For example, a description such as the following is commonly used.

coordinates=(100, 100), character string="This is a pen."

This defines the coordinates (100, 100) at which the sentence "This is a pen." is to be written using the current font and size. Actually, while the drawing of the character "T" is begun at (100, 100), the drawing start points for the individual characters in "his is a pen." are determined in accordance with the width (determined by the font and the character size) of their preceding characters, so that the drawing of these characters is begun at their drawing start points.

The following two methods may be employed to move the characters in the sentence "This is a pen." and to embed information therein.

(a) A method according to which an absolute position is designated for each character and for the drawing of the sentence.

(b) A method according to which an absolute position is provided for the head of a sentence and for embedding a relative travel distance between the characters.

According to method (a), the following expressions are obtained:

coordinates=(100, 100), character string="T",
coordinates=(110, 100), character string="h",
coordinates=(118, 100), character string="i",
coordinates=(123, 100), character string="s", . . .

According to method (b), the following expression is obtained:

coordinates=(100, 100), character string="[(This i)–2(s a p)2(en.)]"

The character string enclosed by [ ] is composed of a combination of characters and relative travel distances. And in the character string enclosed by [ ], the travel distances are positioned between the character string portions that are enclosed by ( )s. In the above example, the character string "This i" is drawn beginning at position (100, 100), and the coordinates are shifted to the left two display units at the point the last "i" is drawn. The next character string "s a p" is then drawn beginning at the new coordinate location. The coordinates are then shifted to the right two display units at the point the "p" is drawn and the string (en) is drawn. A "display unit" represents a distance equal to one coordinate travel distance unit.

Method (b) provides a more compact expression than does method (a). However, a watermark can be easily deleted simply by deleting the relative travel distance that appears in the page description data. If method (b) were able to resist an attack by an unauthorized user, a method could be provided that was both compact and capable of resisting an attack. Such a method will be described later in subdivision (2) of this embodiment for non-alterable page description data.

To detect a watermark, through a layout analysis line data from a character string object are reconstructed in page description data. Based on the order of the reconstructed line data, a value is examined by using the same sequence of locations as is used for the embedding processing. S(aji-bji) is calculated for the j-th bit (j=1, . . . , N). When the result is equal to or greater than a specific positive threshold value, a data value of 1 is obtained. When the result is equal to or smaller than a specific negative threshold value, a data value of 0 is obtained. In other cases, it is ascertained that no effective data exists.

Figure 8:
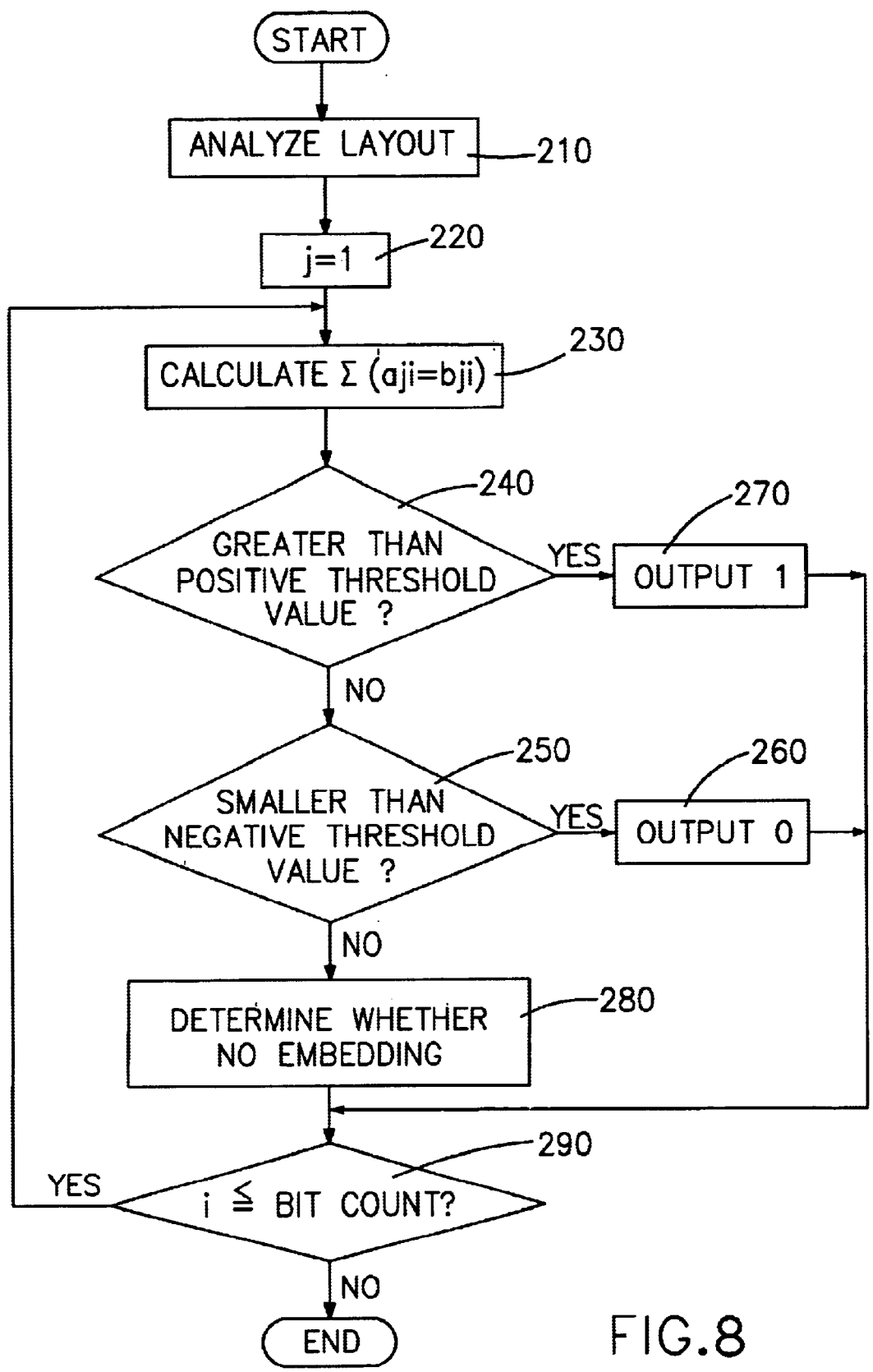
FIG. 8 is a flowchart showing the watermark detection processing according to the present invention.

FIG. 8 is a flowchart showing the watermark detection processing. At step 210 the layout analysis is performed. The layout analysis corresponds to the ordering, based on the layout structure, of characters for which only physical positional information is provided. At step 220 j is initialized as 1, and at step 230 S(aji-bji) is calculated. This calculation corresponds to the processing for generating the same string of random numbers as is used during embedding, and based on the result of the layout analysis, determining the character from which the feature value (aji, bji) is extracted, and for calculating the expression using the feature value. At step 240 a check is performed to determine whether the value obtained by the calculation is equal to or greater than a positive threshold value. If the decision is Yes; "1" is output and program control advances to step 290. If the decision is No, program control moves to step 250, whereat a check is performed to determine whether the value obtained by the calculation is equal to or smaller than a negative threshold value. If the decision is Yes, "0" is output and program control advances to step 290. If the decision is No, program control moves to step 280, whereat it is ascertained that there is no embedded information. At step 290 a check is performed to determine whether j is equal to or smaller than a bit count. If the decision is Yes, program control returns to step 230. If the decision is No, the processing is terminated.

In FIG. 3 is shown an example wherein are overprinted a PDF file before a string of text was embedded, and a PDF file after text was embedded in page description data by employing the method of the present invention. It is evident that the positions of certain characters differ slightly, but for normal use, this difference is not sufficient to cause reader discomfort.

In this invention, through the layout analysis process individual character objects are mapped in the layout structure to implement the ordering and the designation of character objects that can be used for multiple documents. Since the features are designated based on the layout structure, a series of characters can be obtained that can be used in common for multiple documents, while at the same time ensuring that pseudo-randomness is employed. The pseudo-random generation of page p, line 1 and characters c1 and c2 can be based on the employment of an adequate seed (key). It is expected that the thus obtained features ai and bi will strongly correlate with each other when used for multiple documents. This is because the feature of a character string in a font that has similar metrics can be calculated by combining a description of the layout structure and the rule applied to acquire the feature, such as, "only a fill-size font of 9.5 to 10.5 points is a target when counting lines or characters."

Since the positioning information for a character string object is saved even if the string is converted into a different page description language form (e.g., a PostScript file is generated from a PDF and is then converted into a PDF), an embedded watermark is not affected by this type of conversion. Since a common user does not perform an operation (the moving or the editing of an object) to change the appearance of a page description language format, such as PDF, even upon seeing the format, watermarks will not be deleted so long as common users perform normal operations.

(2) Non-alterable Page Description

A method for reconstructing layouts of various objects may be employed to attack a watermark that is embedded in the positional feature of a character string object. Such an attack is called an equalization attack based on the idea that slight differences in the coordinates representing a watermark are equalized. An attack, in this case, is a process for altering page description data, in which a watermark is embedded to obtain another type of page description, and is a very effective means by which to attack and destroy a watermark In this sub-division, an explanation will be given for the following specific methods that are sufficiently robust to cope with such equalization attacks:

Means for so constructing a page description language that the appearance of a document is greatly changed as the result of a superficial equalization process performed only in accordance with the page description appearance.

Means for making it difficult to perform an equalization process (substantial alteration of page description data), including the interpretation of a layout.

Countermeasure for Superficial Equalization

In the following page description, assume that, among the relative travel distances 2, −2, 2 and −2, the second and the third distances are changes added to embed a watermark, and the remaining distances are those added as dummies (as a countermeasure for a conspiratorial attack) coordinates=(100, 100), character string="[Th)2(is i)−2(s a p)2(e)−2 (n.)]" (*) Although an attacker can not distinguish a meaningful change from a dummy, he or she can mechanically delete all the descriptions for relative travel distances, and can produce a page description of:

coordinates=(100, 100), character string="[(This is a pen.)]".

As one of the methods that is sufficiently robust to cope with such an attack, a description using the relative travel distances in a character string is not employed, but a location is described for each character object as follows:

coordinates (100, 100), character string="T"

coordinates=(110, 100), character string="h". . .

However, with this method the size of the page description data is larger than it is when the relative travel distance is employed for a description.

In this invention, the following sufficiently robust method is employed to cope with an equalization attack for a compact page description using the relative travel distances.

(i) Method for Shifting a Reference Point

A reference point for displaying a character string is shifted as follows:

coordinates=(90, 100), character string="[10(This i)−2(s a p)2(en.)]"

In this example, the reference point is not (100, 100) but (90, 100), and the display position is shifted from that reference point to the left 10 display units. Then, before a character string is actually written, the display position is shifted to the right 10. If an equalization attack is made on this expression, the result is coordinates=(90, 100), character string="[(This is a pen.)]".

and the start position is shifted to the left 10.

(ii) Method for separating a character string into individual characters and for combining them to form multiple character strings coordinates=(100, 100), character string="[(T)19(i)10(a) 5(p)]"

coordinates=(100, 100), character string="[3(h)2(is)17(s) 20(e)−2(n.)]"

In this example, a character string, "This is a pen." is broken down into the first character of each word and the remainder, and the individual segments are displayed independently. In its appearance, this string does not differ from that represented by the above method (*). When the equalization attack is given to this expression, the results are coordinates=(100, 100), character string="[Tiap)]"

coordinates=(100, 100), character string="[(hissen.)]"

Thus, character strings "Tiap" and "hissen" are displayed overlapped beginning at (100, 100).

Since the individual character string objects are described using page positions, their appearance on the display is not affected, even when their positions and order in the file are changed. So long as the descriptions concerning multiple objects that form one line are located at random in a file, it is impossible to detect the above separation through the mechanical and local analysis of the appearance.

A combination of the methods (i) and (ii) is more resistant to an equalization attack. In FIG. 4 is shown the result obtained after an equalization attack on a file is expressed using the methods (i) and (ii). While watermark information is destroyed by the equalization, the appearance of a document is also too seriously damaged to be recycled.

Figure 9:
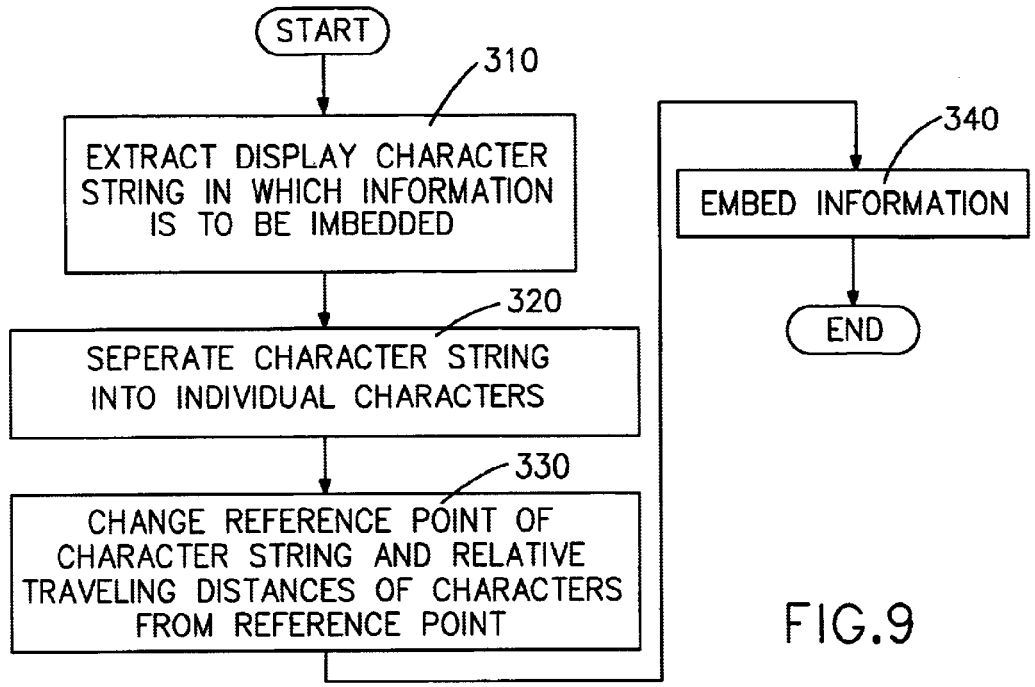
FIG. 9 is a flowchart showing the non-alterable page description processing.

FIG. 9 is a flowchart for non-alterable page description (division of a character string and a change in a reference point). First, at step 310 a display character string in which a watermark is to be embedded is extracted, and at step 320 the character string is divided into individual characters. In this process, a character string is divided into individual characters, or into shorter character strings, and position information is added thereto. At step 330, relative travel distances from the reference point of the character string and from the reference points of the individual characters are changed. To locate characters belonging to the string, the actual position of each character is determined using its relative travel distance from the coordinates that constitute a specific reference. In this case, the reference coordinates are shifted. It should be noted, however, that since the relative travel distances from the reference coordinates of the individual characters are also changed, the locations at which the characters are actually to be written are unchanged. At step 340 information is embedded in the character string.

Countermeasure for Equalization, Including Interpretation of a Layout

As an extreme attack for equalization, a layout analysis used for the input of a document image is performed, and the obtained result and the text code in page description data are employed to prepare new page description data. The results of the layout analysis and character code are employed to generate source code with a tag, such as Latex (actually this is studied for the input of a document image), and the data is reformatted, so that a page description having a different layout from the original is produced by an unauthorized user, an attacker. In this case, watermark information embedded in the original layout is lost.

Figure 5:
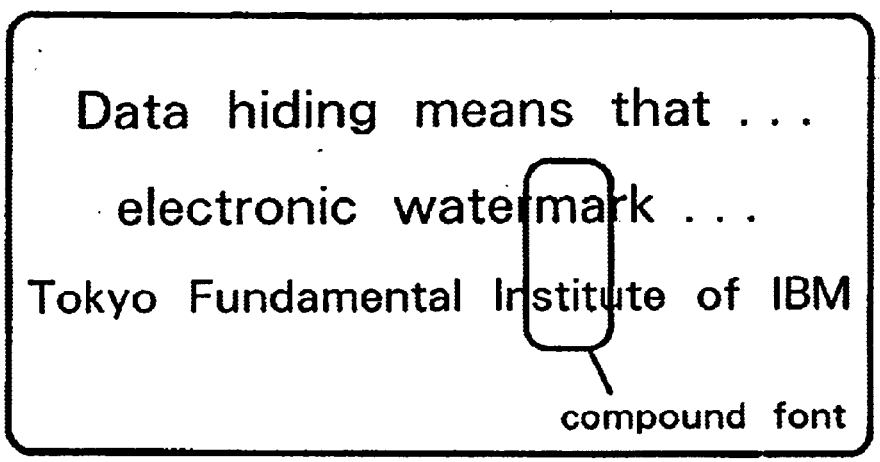
FIG. 5 is a diagram showing characters in two lines that are defined as a single compound font.

To prevent such an attack, page description data are processed so that the layout analysis that serves as the premise is not easily performed. For example, as is shown in FIG. 5, characters in two lines that are aligned vertically are defined as a single font (embedded as a dedicated font in page description data), and are so located that they can not be identified from their appearance. Since the meaning of the shape represented by that font can not be understood through the layout analysis process, the correct logical description for a document can not be output. If such a compound font character and an ordinary character string were united during reformatting, the ratio of the length to the width of a character would be greatly changed and the reading of the character would be difficult. As a result, it is difficult to perform a data distribution whereby an attacker can appear to be the owner of a copyright.

Figure 10:
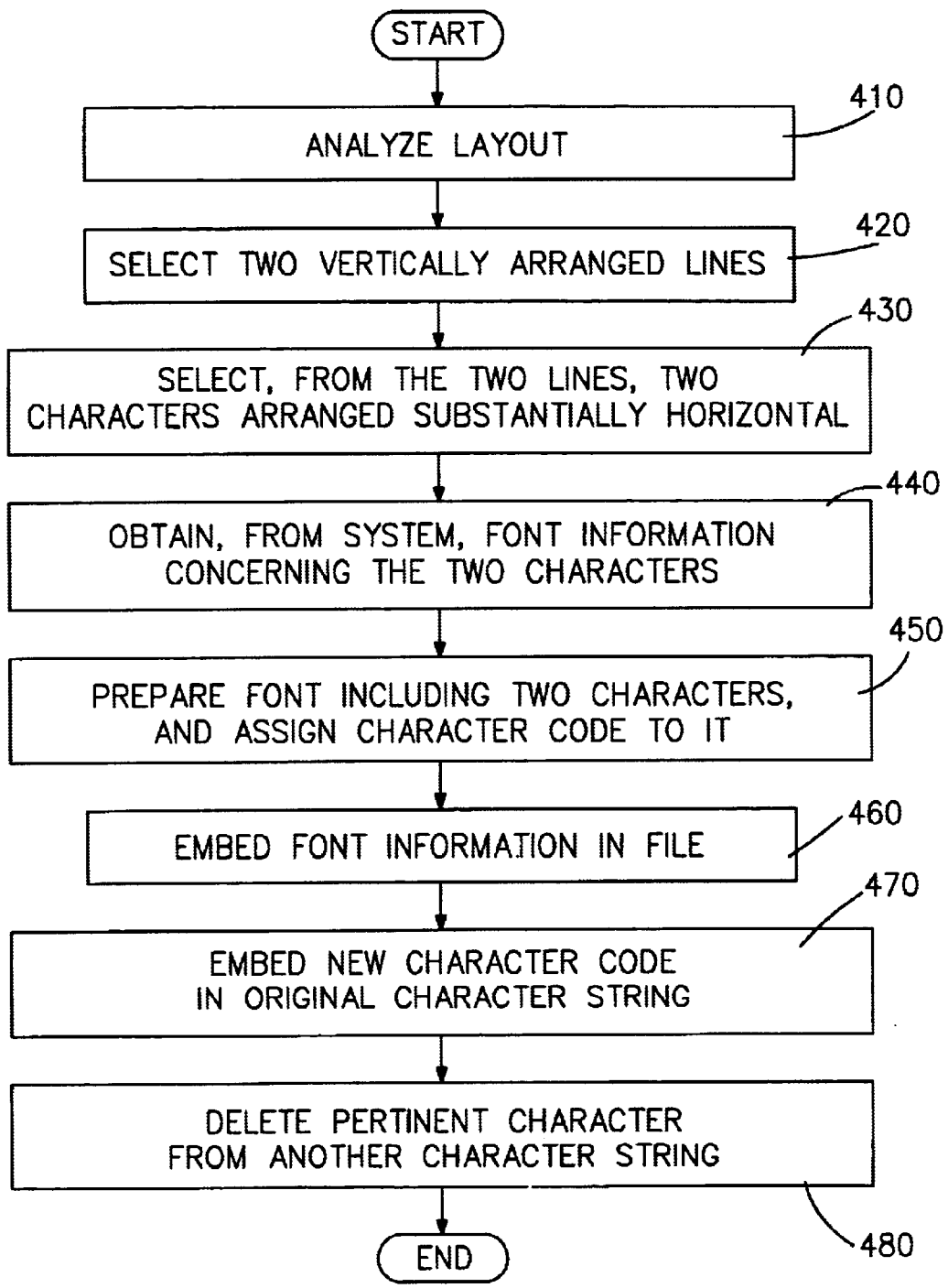
FIG. 10 is a flowchart showing the non-alterable page description (compound font) processing.

FIG. 10 is a flowchart for a non-alterable page description (compound font). At step 410 the layout analysis is performed. At step 420 two vertically arranged lines are selected, and at step 430 two characters positioned substantially horizontally are selected from the two selected lines. At step 440 font information concerning these two characters is obtained from the system. At step 450 a font including the two characters is prepared and character code is assigned to this font. At step 460 the font information is embedded in a file, and at step 470 new character code is embedded in the original character string. Finally, at step 480 the pertinent characters are deleted from another character string. Steps 460 to 480 correspond to the processing for employing the prepared font to replace pertinent characters in the text.

It is satisfactory to determine the location using a pseudo-random number based on an adequate seed, and the compounding of fonts to be performed at one to several locations on a page. If the position of a character object is manually adjusted and a watermark is deleted, so long as a compound font remains, it can be determined that a watermark has been illegally deleted from a document.

A compound font can be constituted by a single character. For example, the character "A" may be prepared as a ¼ size outline font and displayed as a 2% 2 block. Further, characters extending across three lines may be constituted as a single font. In addition, characters that constitute a compound font may not always be adjacent to each other, i.e., may be located apart from each other.

The layout analysis process is employed not only by an unauthorized user, but for the embedding and the detection of a watermark. To provide the required accuracy and complexity of the processing, one of the following physical differences is present.

From the viewpoint of a reference for a user, a correct interpretation is required for a layout analysis for reformatting. However, such correctness is not required for the watermarking analysis, and the same result need be obtained merely for embedding and for detection.

The layout interpretation must be uniquely determined for reformatting. However, during extraction, detection of a watermark can be attempted for multiple available layout results.

Therefore, the layout analysis used for the embedding/detection processing can be implemented more easily than can the analysis for reformatting.

In the present invention, the processing (i) for shifting a reference point, and the processing (ii) for dividing a character string into individual characters and for combining them to obtain multiple character strings is performed to cope with an attack mounted to interpret page description data and to delete information for moving a location. Therefore, page description data can be so formed that the illegal alteration of layout information affects the appearance of a document. Since the destruction of a watermark causes damage to a layout (in its appearance), a damaged document can not be re-distributed A countermeasure for reducing the accuracy of a layout analysis using a compound font can be taken to cope with an attack during which page description reformatting is performed after the layout analysis has been completed. The presence of a compound font can be detected from page description data only if an attacker prepares a program. However, a user must visually identify words that are coupled together, otherwise the compound font can not be separated into independent fonts, and the reformatting results are adversely affected. Therefore, the processing required to mechanically delete watermarks from many documents is difficult.

(3) Prevention of Extraction of Text Information

Figure 6:
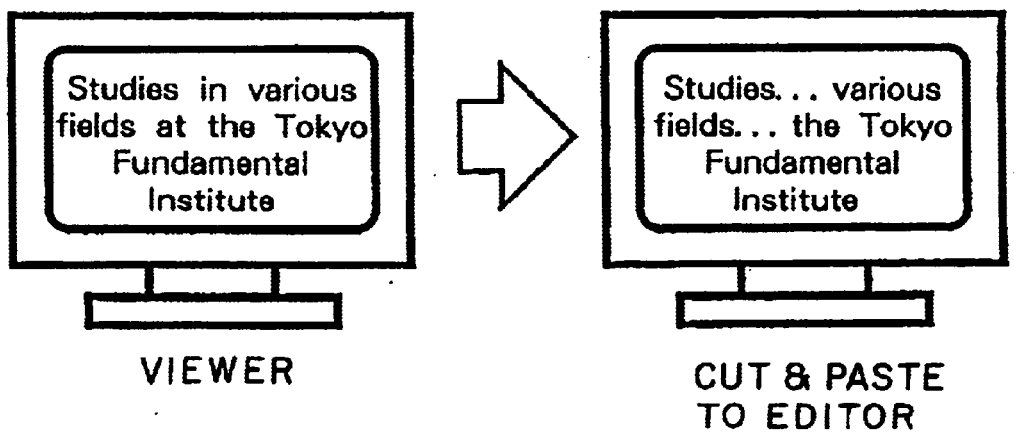
FIG. 6 is a diagram showing the editing results obtained by the replacement of a graphic primitive.

Text code in page description data is deleted and is replaced by a set of graphic primitives that draw the same character. A character may be expressed using code that differ from that of an ordinary system, and font information for displaying it may be assembled in the page description data. The replaced "character" is then processed as a line image. Although the shape of the displayed image is a character, the image can not be identified as a character using the string of graphic primitives. Therefore, as is shown in FIG. 6, when only text data are displayed by an editor by using Cut&Paste, even when viewing and printing is available by employing PDF display software, either characters are not displayed or a meaningless character string is displayed.

The above alteration is not reversible, and the original can not be recovered by using a coding program. Examinations and data entries performed by human beings are indispensable in order to obtain the same text information as it actually appears. Even when the above processing is performed for only one part of the text data, such as the characters that appear frequently in a document or the articles "ha, ga and no," a document that is extracted is difficult to read. As a result, the same effects obtained by processing the text in its entirety can be acquired by performing the activity implied by the meaning of the "requirement for manual checking."

Figure 11:
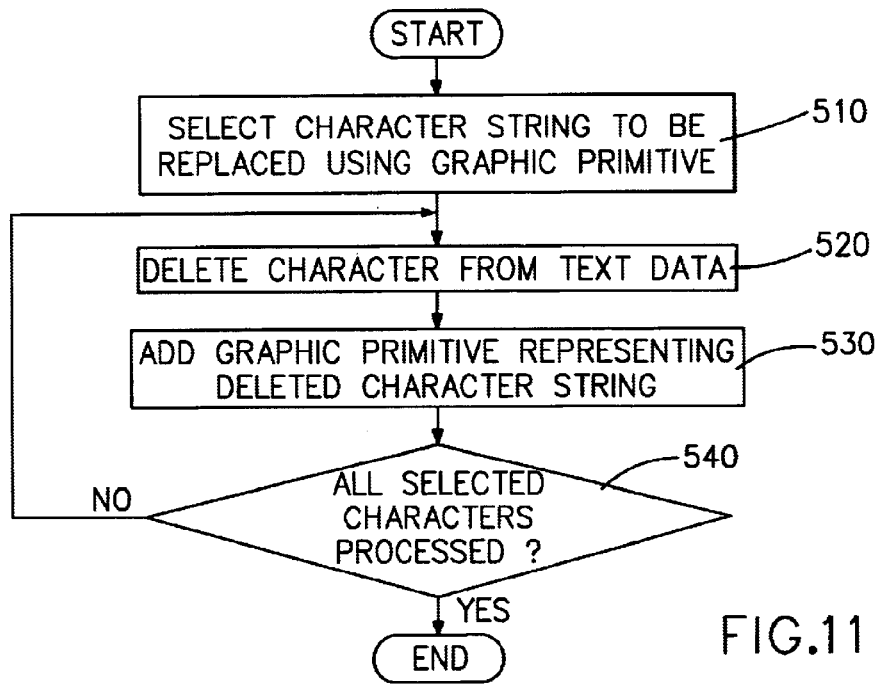
FIG. 11 is a flowchart showing the text information extraction prevention processing according to the present invention.

FIG. 11 is a flowchart showing the processing for preventing the extraction of text information. At step 510 a character to be replaced by graphic primitives is selected. The selection of a character to be replaced by graphic primitives corresponds to the selection of character data to be prevented from being extracted from page description data, i.e., it corresponds to the selection of a set of locations representing a character, a line and a page. At step 520 the selected character is deleted from the text data. Here, the deletion of the selected character from the text data corresponds to the deletion of a target character from the text data in a page description language. If necessary, page description data are changed, and the display location of a succeeding character is clearly described. This is done in order to prevent the succeeding character from being displayed at the location occupied by the deleted character. At step 530 the graphic primitive representing the deleted character is added. The addition of the graphic primitive representing the deleted character corresponds to the addition, to the page description data, of graphic primitives whereby graphics having a similar appearance can be displayed at a location occupied by the deleted character. Finally, at step 540 a check is performed to determine whether all the selected characters have been processed. If the decision is Yes, the processing is terminated. If the decision is No, program control returns to step 520.

Since a character is not expressed by using the code but instead is expressed by using a graphic primitive, text information can be prevented from being stolen by using Cut&Paste, or by employing an automatic character information extraction program. All the characters in a document can be independently defined. However, even if only a character that frequently appears is replaced, visual checking is required after text has been extracted, and the amount of manual labor involved is increased, so that the theft of text information can be prevented. Also, whether text has been illegally extracted can be determined because a specific character is missing. So long as a small number of characters are processed, even when character font information is embedded as a graphic primitive in a page description file, the size of the file will be increased only slightly, and the practical usability of the file as distribution data will not be lost.

The PDF display software that is a typical document format in a page description language has a function whereby a password is used to inhibit Cut&Paste. However, the control for "permitting display and inhibiting Cut&Paste" is simply implemented by referring to the flag for a PDF file. According to the present invention, only if code information (or one part of it) is removed from page description data, can the stealing of text code essentially be prevented, without depending on the implementation of a display program.

In addition, since one part of the code in text is removed, the manual labor required for confirmation is increased as the result of an attack to force the reformatting of page description data, which was explained in the (2) non-alterable page description, and the mechanical destruction/copying of a watermark is difficult.

In FIG. 2 is shown an example hardware arrangement, according to the present invention, for a system for embedding/detecting a watermark. A system 100 comprises a central processing apparatus (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. It is preferable that information to be embedded, or a document file in which information is to be embedded, be stored in the auxiliary storage device. Similarly, the CPU 1 and the memory 4 are connected by the bus 2 and a SCSI controller 27 is connected to a hard disk drive 30 (or to a storage medium drive, such as an MO 28, a CD-ROM 29 or a DVD 31), which is an auxiliary storage device. A floppy disk drive 20 is connected to the bus 2 via a floppy disk controller 19.

A floppy disk is inserted into the floppy disk drive 20, and code or data for a computer program, which interacts with an operating system and issues instructions to the CPU 1 for implementing the present invention, can be stored on the floppy disk, or on the hard disk drive 13 (or on the MO, the CD-ROM 26 or the DVD 32), and in a ROM 14. This computer program is executed by loading it into the memory 4. This code, and it associated data, includes an OS, an embedding/detection program, and font data. The code for the computer program can be compressed, or can be divided into multiple segments for storage on multiple storage mediums.

The system 100 further comprises user interface hardware components, such as a pointing device (a mouse or a joystick) 7 and a keyboard 6 for entering data, and a display device 12 for providing visual data for a user. Furthermore, a printer can be connected to the system 100 via a parallel port 16, or a modem can be connected via a serial port 15. For communicating with another computer, the system 100 can be connected to a network via the serial port 15 and a modem, or via a communication adaptor 18 (an ethernet or a token ring card). A remote transceiver is connected to the serial port 15, or to the parallel port 16, for exchanging data with the system 100 using infrared rays or wires. Through the communication functions, information to be embedded, or a document file in which information is to be embedded may be obtained externally.

A loudspeaker 23 is used to receive, via an amplifier 22, an audio signal produced by a D/A conversion (digital/analog conversion) performed by an audio controller 21, and to output the signal as sound. The audio controller 21 performs the A/D (analog/digital) conversion of audio information received via a microphone 24 in order to introduce external audio data into the system 100.

As is described above, it would be easily understood that the system of the present invention can be provided by an ordinary personal computer (PC); a workstation, a notebook PC, a palmtop PC, a network computer, a television set or another electric home appliance that incorporates a computer; a game machine having a communication function; a communication terminal having a communication function, such as a telephone, a facsimile machine, a portable telephone, a PHS or a PDA; or a combination of the components described above. It should be noted, however, that these components are merely examples, and not all of them are required for the present invention.

According to the present invention for the electronic watermarking of a PDF file in a page description language, it is possible to prevent the copying of many PDF files, the illegal construction of a document database, and an illegal distribution service that employs data in accordance with the database. In order to preclude illegal business transactions, information representing a copyright can be embedded as a watermark in a text file. If an unauthorized user removes the watermark and reconstructs a file to use for business, he or she can not mechanically delete a watermark from a large number of document pages.

Having thus described our invention, what is claimed is:

1. An information embedding system for embedding information in document data, including text written in a page description language, comprising:

(1) means for analyzing the layout of characters of said document data in which information is to be embedded;

(2) means for, based on analyzing of said layout, dynamically selecting a sequence of character locations whereat said information is to be embedded;

(3) means for embedding said information by altering said characters, wherein said altering comprises creating a graphic primitive representing at least one of said characters and substituting said graphic primitive for said at least one of said characters; and (4) means for changing a page description for said text at a designated location in accordance with said embedded information.

2. The information embedding system according to claim 1, wherein said sequence of locations is selected by producing a string of sequential pseudo-random numbers.

3. The system according to claim 1, wherein said page description of said text is a description representing the coordinates of a character.

4. An information embedding system for embedding information in document data, including text written in a page description language, comprising:

(1) means for analyzing the layout of characters of document data in which information is to be embedded;

(2) means for dynamically selecting a sequence of character locations whereat said information is to be embedded based on said analyzing;

(3) means for embedding said information by altering said characters, wherein said altering comprises creating a font representing at least one of said characters and substituting said font for said at least one of said characters; and (4) means for changing a page description for said text at a designated location in accordance with said embedded information.

5. An information embedding method for embedding information in document data, including text written in a page description language, comprising the steps of:

(1) analyzing the layout of characters of said document data in which information is to be embedded;

(2) based on said analyzed layout, dynamically selecting a sequence of character locations whereat said information is to be embedded;

(3) embedding said information by altering said characters, wherein said altering comprises creating a graphic primitive representing at least one of said characters and substituting said graphic primitive for said at least one of said characters; and (4) changing a page description for said text at a designated location in accordance with said embedded information.

6. An information embedding method for embedding information in document data, including text written in a page description language, comprising the steps of:

(1) analyzing the layout of characters of the data in a document in which information is to be embedded;

(2) dynamically selecting a sequence of character locations whereat said information is to be embedded based on said analyzing;

(3) embedding said information by altering said characters, wherein said altering comprises creating a font representing at least one of said characters and substituting said font for said at least one of said characters, and (4) changing a page description for said text at a designated location in accordance with said embedded information.

7. A storage medium for storing a program for embedding information in document data, including text written in a page description language, said program comprising:

(1) a function for analyzing the layout of characters of said document data in which information is to be embedded;

(2) a function for, based on said analyzing of said layout, dynamically selecting a sequence of character locations whereat said information is to be embedded;

(3) a function for embedding said information by altering said characters, wherein said altering comprises creating a graphic primitive representing at least one of said characters and substituting said graphic primitive for said at least one of said characters; and (4) a function for changing a page description of said text at a designated location in accordance with said embedded information.

8. A storage medium for storing a program for embedding information in document data including, text written in a page description language, said program comprising:

(1) a function for analyzing the layout of characters of the data in a document in which information is to be embedded;

(2) a function for dynamically selecting a sequence of character locations whereat said information is to be embedded based on said analyzing;

(3) a function for embedding said information by altering said characters, wherein said altering comprises creating a font representing at least one of said characters and substituting said font for said at least one of said characters; and (4) a function for changing the page description for said text at a designated location in accordance with said embedded information.

* * * * *